United States Patent [19]

Jordan et al.

[11] 3,864,305

[45] *Feb. 4, 1975

[54] CARBON BLACK REINFORCED COMPOSITIONS

[75] Inventors: Merrill E. Jordan, Walpole; William G. Burbine, Whitman; Frank R. Williams, Quincy, all of Mass.

[73] Assignee: Cabot Corporation, Boston, Mass.

[ * ] Notice: The portion of the term of this patent subsequent to Mar. 26, 1991 has been disclaimed.

[22] Filed: Apr. 2, 1973

[21] Appl. No.: 346,979

[52] U.S. Cl. ............ 260/42.47, 106/307, 260/42.46, 260/42.49, 260/42.52, 260/738, 260/763, 423/445, 423/450, 423/455, 423/458, 423/460
[51] Int. Cl. ......................................... C08c 11/18
[58] Field of Search ............ 106/307; 423/445, 450, 423/455, 458, 460; 260/42.46, 42.49, 42.52, 738, 763

[56] References Cited
UNITED STATES PATENTS

| | | | |
|---|---|---|---|
| 3,443,901 | 5/1969 | Wendell et al. | 260/41.5 R |
| 3,595,618 | 6/1971 | Kiyonaga et al. | 260/41.5 R |
| 3,619,140 | 11/1971 | Morgan et al. | 260/41.5 R |

*Primary Examiner*—Morris Liebman
*Assistant Examiner*—W. H. Fletcher
*Attorney, Agent, or Firm*—Kenneth W. Brown; Barry R. Blaker; Lawrence A. Chaletsky

[57] ABSTRACT

This disclosure relates to the use of a certain class of carbon black pigments as reinforcing agents in the preparation of rubber compositions having improved properties.

10 Claims, No Drawings

CARBON BLACK REINFORCED COMPOSITIONS

This invention relates to new and useful natural and synthetic rubber compositions. In particular, this invention relates to new and improved rubber compositions comprising a natural or synthetic rubber and a certain class of carbon black products which improve the physical properties of the rubber to which it is added.

Normally, there have been widely employed as fillers and reinforcing pigments in the compounding and preparation of rubber compositions various conventional carbon blacks known heretofore. Ordinarily, the conventional carbon blacks are effective in the preparation of rubber vulcanizates having improved reinforcement properties such as tensile strength, modulus and treadwear. The improvement in properties exhibited by an elastomeric article or rubber stock filled with a carbon black will depend to a great extent upon the type of elastomer utilized and the particular carbon black incorporated therein. It has now been made possible by using the carbon black products of the present invention to provide finished products having still further improved tensile strength, modulus, abrasion resistance, and treadwear.

Accordingly, it is a principal object of this invention to provide improved natural and synthetic rubber compositions.

It is a further object of this invention to provide a suitable carbon black reinforcing additive for natural and synthetic rubbers which imparts the desired properties to the resultant composition.

Other objects and advantages of the present invention will be apparent to those skilled in the art from the following detailed description and claims.

In accordance with this invention, it has been found that the above and still further objects are accomplished by incorporating a certain class of novel carbon black products into a natural or synthetic rubber.

Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to 80 parts of carbon black per 100 parts of rubber.

The rubbers for which the novel carbon blacks of this invention are effective as reinforcing agents include natural and synthetic rubbers. Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1; particularly preferred are the ethylene-propylene copolymers wherein the ethylene content ranges from 20 to 90 percent by weight and also the ethylene-propylene polymers which additionally contain a third monomer such as dicylopentadiene, 1, 4-hexadiene and methylene norbornene.

The reinforcing agent utilized in the rubber compositions of the present invention include a novel group of carbon blacks which are of the furnace process type, are non-aftertreated, have a pH value of at least 4.0, an iodine surface area ranging from at least 67 to about 145 $m^2/g$, a tint factor value, represented by the relationship of [tint + 0.6 ($D_a$)], of at least 311 to 316, a BET nitrogen surface area of less than 160 $m^2/g$, and a value for the tint contribution, which is defined as the ratio of tint to tint factor, varying from at least 0.75 to 0.82. In determining the value for the tint factor of the blacks, $D_a$, the apparent diameter, is defined as the diameter, in millimicrons, of a solid carbon sphere containing the same amount of carbon as the average amount of carbon per agglomerate in a paper by Avrom I. Medalia and L. Willard Richards entitled "Tinting Strength of Carbon Black" presented to the American Chemical Society, Division of Coatings and Plastic Chemistry, Toronto, Canada, May 1970. For purpose of this invention, the apparent diameter, $D_a$, is obtained from the calculation [2270 + 63.5 (DBP)]/Iodine Surface Area. If desired, the carbon blacks herein may be described in terms of percent tint contribution by multiplying the value for the ratio of tint to tint factor by 100.

In the preparation of the hot combustion gases employed in preparing the novel type of carbon black products of the present invention, there are reacted in any conventional combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components, and, in particular, hydrocarbons. For example, streams rich in methane such as natural gas and modified or enriched natural gas are excellent fuels as well as other streams containing high amounts of hydrocarbons such as various petroleum gases and liquids and refinery by-products including ethane, propane, butane and pentane fraction, fuel oils and the like. The carbon black products of the present invention are prepared by reacting the aforementioned combustion reaction products with any of a wide variety of hydrocarbon feedstocks.

Accordingly, in greater detail, the novel carbon black products are prepared by reacting a carbon black-yielding hydrocarbon feedstock with hot gaseous products of an initial combustion reaction which are flowing at a high linear velocity in a suitable reaction zone. The hot combustion gases are readily generated by contacting a combustible fuel with an amount of oxidant, such as air or oxygen, which, if desired, may be preheated varying from about 50 to about 500 percent of the amount required for complete combustion of the combustible fuel to the desired hot gaseous products in any type of conventionally known burner designed to produce a stream of hot combustion gases flowing at a high linear velocity. It is, furthermore, desirable that there be a pressure differential between the combustion chamber and the reaction chamber of at least 1.0 p.s.i., and more preferably, of about 1.5 to about 10 p.s.i. Under these conditions, there is produced a stream of gaseous combustion products possessing sufficient energy to convert a carbon black-yielding hydrocarbon feedstock to the desired carbon black products. The resultant combustion gases emanating from the combustion zone attain temperatures of at least about 2400°F, and in most instances the temperature is in excess of about 3000°F. The hot combustion gases flow in a downstream direction at a high linear velocity which may be effectuated by passing the combustion gases through any suitable passage or inlet which may optionally be tapered or restricted such as a conventional venturi throat. There is then introduced into the stream of hot combustion gases traveling at a high velocity at a point where there exists a pressure differential between the combustion chamber and the reaction chamber of above about 1.0 p.s.i., a suitable carbon black-yielding hydrocarbon feedstock thereby insuring a high rate of mixing and shearing of the hot combustion gases and the hydrocarbon feedstock so as to rapidly and completely decompose and convert the feedstock to the novel carbon blacks in high yields. The hydrocarbon feedstock is injected substantially transversely from the periphery of the stream of hot combustion gases in the form of a single or preferably a plurality of small, coherent jets which penetrate into the interior regions of the stream of combustion gases. The amount of feedstock utilized will be adjusted in relation to the amounts of fuel and oxidant employed so as to result in an overall percent combustion for the process ranging from about 12 to about 65 percent and, preferably, from about 20 to about 50 percent. Following the period of reaction in the reaction zone, which may vary from about 1 to about 100 milliseconds, or even shorter periods of time, the effluent gases containing the desired carbon black products suspended therein are passed downstream to any conventional cooling and separating means whereby the carbon blacks are recovered. The separation of the carbon black from the gas stream is readily accomplished by conventional means such as a precipitator, cyclone separator and bag filter.

The following test procedures are used in the determination and evaluation of the physical properties and efficiency of the carbon blacks of the present invention.

In the following procedures, the analytical properties are determined using the pelleted form of the carbon blacks. In the event the blacks are to be used in an application where the fluffy form is desired, then a portion of the fluffy black is pelletized for purposes of characterizing the blacks in accordance with the test procedures hereinbelow.

DBP Absorption - In accordance with the procedure set forth in ASTM D-2414-65T, now designated as ASTM D-2414-70, absorption characteristics of pelleted carbon blacks are determined. In brief, the test procedure entails adding dibutyl phthalate (DBP) to a pelleted carbon black until there occurs a transition from a free-flowing powder to a semi-plastic agglomerate. The value is expressed as cubic centimeters (c.c.) of dibutyl phthalate (DBP) per 100 grams of carbon black.

Iodine Surface Area - The surface area of pelletized carbon black products is determined in accordance with the following iodine adsorption technique. In this procedure, a carbon black sample is placed into a porcelain crucible equipped with a loose-fitting cover to permit escape of gases and is devolatilized for a 7-minute period at a temperature of 1700°F in a muffle furnace and then allowed to cool. The top layer of calcined carbon black is discarded to a depth of one fourth inch and a portion of the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear, following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a blank sample. Finally, the iodine surface area expressed in square meters per gram is calculated in accordance with the formula

[(% Iodine Adsorbed × 0.937) − 4.5]/Sample Weight = Iodine Surface Area

This procedure for determining iodine surface areas of carbon black pellets is designated as Cabot Test Procedure No. 23.1 for purposes of convenience inasmuch as there is still no official ASTM designation. As shown in a Cabot Corporation publication TG-70-1 entitled "Industry Reference Black No. 3" by Messrs. Juengel and O'Brien published on April 1, 1970, the iodine surface area of IRB No. 3 (Industry Reference Black No. 3) is 66.5 m²/g as determined in accordance with Cabot Test Procedure 23.1 referred to hereinabove.

Tinting Strength - Tinting strength represents the relative covering power of a pelletized carbon black when incorporated in a 1 to 37.5 weight ratio with a standard zinc oxide (Florence Green Seal No. 8 made and sold by New Jersey Zinc Co.), dispersed in an epoxyized soybean oil type plasticizer (Paraplex G-62 made and sold by Rohm and Haas Co.) and compared to a series of standard reference blacks tested under the same conditions. More particularly, the test involves mulling carbon black, zinc oxide, and plasticizer, in such proportions that the resulting ratio of carbon black to zinc oxide is 1 to 37.5. Reflectance measurements utilizing a Welch Densichron apparatus are then obtained from a film cast on a glass plate and readings are compared to carbon black standards having known tinting strengths. The tinting strengths of the carbon black standards are determined utilizing an arbitrarily assigned value of 100% for the tinting strength of the Cabot standard SRF carbon black. In this instance, as is conventionally done, the standard SRF carbon black arbitrarily assigned a value of 100% for tinting strength is Sterling S or Sterling R semi-reinforcing furnace black made by Cabot Corporation. Each of the Sterling R or Sterling S reference blacks is characterized by having, among other properties, a BET nitrogen surface area of about 23 m²/g, an oil absorption of about 65 to 70 lbs. oil/100 lbs. black, and an average particle diameter of about 800 angstroms as determined by electron microscopy. The only difference is that Sterling R carbon black is in a fluffy form while the Sterling S carbon black is in pelleted form. Accordingly, the black selected for reference purposes then is determined by the state of the blacks to be measured for tinting strengths. The Sterling R or Sterling S semi-reinforcing carbon black is thus considered as the primary reference standard for determining tinting strengths of the other blacks.

Furthermore, as described above, additional carbon blacks are utilized as references for establishing tinting strength values covering the range of about 30% to about 250 percent. These are determined relative to the primary standard having the arbitrarily assigned value of 100% for tinting strength. In this manner, a series of blacks having a wide range of tinting strengths is made available so as to provide reference blacks that approximate as closely as possible the black to be measured. Exemplary carbon blacks employed as auxiliary tinting strength standards for purposes of the above procedure include the following blacks made by Cabot Corporation. The analyticals are determined in accordance with the test procedures set forth in the present application.

black no. D-6607 having an arbitrarily assigned value of 100 percent.

In carrying out the above roadwear evaluations there is used the following fomulation of ingredients, expressed in parts by weight, which are admixed by means of a Banbury mill.

| Ingredient | Parts by Weight |
|---|---|
| Styrene-butadiene | 89.38 |
| Cis-4-polybutadiene | 35 |
| Carbon black | 75 |
| Sundex 790 | 25.62 |
| Zinc oxide | 3 |
| Sunproof Improved | 2.5 |
| Wingstay 100 | 2 |
| Stearic acid | 2 |
| Santocure (CBS) | 1.4 |
| Sulfur | 1.75 |

With regard to the foregoing formulation for use in road tests, designated hereinafter as RTF-1, Santocure (CBS) is the trade designation for N-cyclohexyl-2-benzothiazole-sulfenamide, a curing agent for rubber systems; Sundex 790 is the trade name for a plasticizer sold by Sun Oil Company; Sunproof Improved is the

| Analytical Properties | Sterling MT (Medium Thermal) | Sterling FT (Fine Thermal) | Vulcan 6H | Vulcan 9 |
|---|---|---|---|---|
| Tinting Strength, % | 31 | 56 | 220 | 252 |
| Iodine Surface Area, m²/g | 5.0 | 8.4 | 109.6 | 118.5 |
| DBP Absorption, cc/100 g | 33.6 | 35.9 | 131.4 | 116.9 |

For purposes of reference, the tinting strength of IRB No. 3 as determined in accordance with the above procedure is 208% of the primary Sterling S semi-reinforcing black. This is also disclosed in the earlier mentioned publication on Industry Reference Black No. 3 by Messrs. Juengel and O'Brien.

Roadwear Rating - The procedure for measuring and evaluating roadwear or treadwear is well known to the art and is completely described in Cabot Corporation's Technical Service Report No. TG-67-1 on "The Use of Multi-Section Treads in Tire Testing" by Fred E. Jones (1967). It is to be noted that, as in the case of any procedure for measuring wear ratings, the evaluations are made relative to a standard reference black which is arbitrarily assigned a wear rating value of 100 percent. In this instance, the black selected as the reference standard for evaluating roadwear is an ISAF (intermediate super abrasion furnace) type black, having an ASTM designation of N-220, made by Cabot Corporation and further characterized by having a tinting strength of 232%, an iodine surface area of 97.9 m²/g, a DBP absorption of 114.9 cc/100 g, and a density of 22.2 lbs./cu.ft. For ease of reference, this treadwear reference black is described as Cabot's ISAF type reference black no. D-6607. The above method for determining relative wear ratings of treadstocks is preferred to the use of laboratory tests for measuring abrasion since it is known to be difficult to extrapolate such results to actual performance. Accordingly, the roadwear results shown herein reflect accurately the performance of treadstocks relative to Cabot's standard ISAF type trade name for an antiozonant sold by Uniroyal Chemical Company; and Wingstay 100 is the trade name for a stabilizer comprising mixed diaryl-p-phenylene diamines sold by Goodyear Tire and Rubber Company.

Total Surface Area - The total surface area of the carbon blacks is measured in accordance with the well-known BET technique utilizing nitrogen isotherms. The BET (Brunauer-Emmet-Teller) method is completely described in an article appearing in the Journal of the American Chemical Society, Vol. 60, page 309 (1938). Surface areas obtained in the usual manner by the BET technique include the external surface area as well as the internal surface area contributed by the presence of pores.

Rebound - This is determined in accordance with the procedure set forth in ASTM D-1054-66.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example there is employed a suitable reaction apparatus provided with means for supplying the combustion gas-producing reactants, i.e., a fuel and an oxidant stream, either as separate streams or as precombusted gaseous reaction products, and also means for supplying the carbon black-yielding hydrocarbon feedstock to the apparatus. The apparatus may be constructed of any suitable material such as metal and either provided with a refractory insulation or surrounded by means for cooling such as a recirculating liquid which is preferably water. Additionally, the reaction apparatus is equipped with temperature and pressure recording means, means for quenching the carbon black-forming reaction such as spray nozzles, means for cooling the carbon black product and means for separating and recovering the carbon black from other undesired by-products. Accordingly, in carrying out the present process for preparing the novel carbon blacks, the following procedure is employed. In order to obtain the desired flame, there are charged into a combustion zone of the apparatus through one or more inlets oxygen at a rate of 2000 SCFH and natural gas at a rate of 625 SCFH thereby generating a stream of combustion gases flowing in a downstream direction at a high linear velocity which possesses a kinetic head of at least 1.0 p.s.i. greater than the pressure of the reaction chamber. Accordingly, in a preferred embodiment of the present invention, the rapidly flowing stream of combustion gases is passed through a constricted or tapered portion of the apparatus having a fixed cross section or throat such as a conventional venturi throat in order to increase the linear velocity of the stream of combustion gases. There is then introduced transversely into the resultant stream of hot combustion gases having the desired kinetic head a carbon black-yielding hydrocarbon feedstock through one or more passages or inlets located peripherally to the stream of combustion gases at a rate of 16.2 gallons per hour. The feedstock used is Sunray DX which is a fuel having a carbon content of 91.1% by weight, a hydrogen content of 7.9% by weight, a sulfur content of 1.3% by weight, a hydrogen to carbon ratio of 1.04, a B.M.C.I. Correlation Index of 133, a specific gravity in accordance with ASTM D-287 of 1.09, an API gravity in accordance with ASTM D-287 of −2.6, an SSU viscosity (ASTM D-88) at 130°F of 350, an SSU viscosity (ASTM D-88) at 210°F of 58 and an asphaltenes content of 5.7 percent. The reaction conditions used in this instance are such as to provide an overall combustion of 30.3 percent. The carbon black forming reaction is then quenched with water to a temperature of 900°F in a separate zone downstream of the reaction zone and the resultant carbon black-containing gases are subjected to the conventional steps of cooling, separation and recovery of the carbon black product in a yield of 4 pounds per gallon of fuel. The carbon black product thus obtained is characterized by having a tint value of 257%, an iodine surface area of 129 m$^2$/g, a DBP absorption value of 155, a pH of 6.5, an apparent diameter, $D_a$, of 93.9, a value for the tint factor relationship of [tint + 0.6 ($D_a$)] of 313.3, a BET nitrogen surface area of 146 m$^2$/g, and a value for the ratio of tint to tint factor of 0.82.

EXAMPLE 2

A suitable reaction apparatus as described in Example 1 is charged with oxygen at a rate of 2000 SCFH and natural gas at a rate of 360 SCFH in order to produce a suitable flame for carrying out the reaction. To the downstream-flowing combustion gases which have been passed through a constricted or tapered portion of the apparatus there is then fed the Sunray DX hydrocarbon feedstock at a rate of 19.2 gallons per hour. In this run, the reaction conditions are maintained in a manner such as to provide an overall combustion of 27 percent and the reaction is quenched with water to a temperature of 684°F. At the conclusion of the reaction there is produced in a yield of 3.6 pounds per gallon of fuel a carbon black product having a tint value of 242%, an iodine surface area of 103 m$^2$/g, a DBP absorption value of 164, an apparent diameter, $D_a$, of 123.1, a value for the tint factor relationship [tint + 0.6 ($D_a$)] of 316, a pH value of 6.8, a BET nitrogen surface area of 118 m$^2$/g, and a value for the tint contribution ratio of tint to tint factor of 0.77.

EXAMPLE 3

In accordance with the procedure of Example 1, air preheated to 760°F at a rate of 340,000 SCFH and natural gas at a rate of 23,800 SCFH are fed into the combustion zone of the reaction apparatus. To the resultant downstream flow of hot combustion gases there is charged Enjay hydrocarbon feedstock under a pressure of 228 p.s.i.g. at a rate of 533 gallons per hour. Prior to adding the feedstock, potassium chloride is added to the stream of hot combustion gases in an amount of 4.3 grams per 100 gallons fuel. In more detail, the Enjay hydrocarbon feedstock employed is a fuel having a carbon content of 89.8% by weight, a hydrogen content of 8.6% by weight, a sulfur content of 1.5% by weight, a hydrogen to carbon ratio of 1.15, a B.M.C.I. Correlation Index of 123, a specific gravity in accordance with ASTM D-287 of 1.08, an API gravity in accordance with ASTM D-287 of −0.3, an SSU viscosity (ASTM D-88) at 130°F of 569.2, an SSU viscosity (ASTM D-88) at 210°F of 67.5 and an asphaltenes content of 0.6 percent. The reaction is carried out at an overall combustion of 31.8 percent and the reaction is quenched with water to a temperature of 1400°F. There is obtained, in a yield of 5 pounds per gallon of fuel oil, a carbon black product having a tint value of 239%, an iodine surface area of 74.6 m$^2$/g, a DBP absorption value of 112, a pH of 6.7, an apparent diameter, $D_a$, of 126, a value for [tint + 0.6 ($D_a$)] of 314, a BET nitrogen surface area of 92 m$^2$/g, and a tint contribution ratio of tint to tint factor of 0.76.

EXAMPLE 4

Following the procedure of Example 1 there are charged to a combustion zone a stream of air at a temperature of 760°F at a rate of 340,000 SCFH and a stream of natural gas at a rate of 24,200 SCFH to produce the desired flame. Into the gaseous products of the combustion reaction there is then fed under pressure of 250 p.s.i.g. as the hydrocarbon feedstock Enjay oil at a rate of 544 gallons per hour and the reaction conditions are maintained so as to produce an overall combustion of 31.2 percent. During the preparation of the carbon black of this example, which is produced in a yield of 5.3 pounds per gallon fuel oil, potassium chloride is added in an amount of 7.6 grams per 100 grams of fuel oil and the reaction is quenched with water to a temperature of 1330°F. The resultant carbon black product is characterized by having an iodine surface area of 69.5 m$^2$/gm, a DBP absorption value of 108, a tint value of 237%, a pH of 7.0, an apparent diameter, $D_a$, of 131, a tint factor value for [tint + 0.6

($D_a$)] of 316, a BET nitrogen surface area of 90 m²/g, and a value for the ratio of tint to tint factor of 0.75.

EXAMPLE 5

Following the procedure of Example 1, air preheated to 710°F at a rate of 340,000 SCFH and natural gas at a rate of 24,000 SCFH are fed into the combustion zone of the reaction apparatus. To the resultant downstream flow of hot combustion gases there is charged Enjay oil feedstock at a rate of 476 gallons per hour and under a pressure of 250 p.s.i.g. The reaction is carried out at an overall combustion of 34.8 percent and there is obtained in a yield of 5 pounds per gallon of fuel oil a carbon black product having an iodine surface area of 78.6 m²/g, a DBP absorption value of 121, a tint value of 240%, a pH of 6.7, an apparent diameter, $D_a$, of 127, a tint factor value for [tint + 0.6 ($D_a$)] of 316, a BET nitrogen surface area of 102 m²/g, and a value for the ratio of tint to tint factor of 0.76.

The suitability of the blacks of the present invention as reinforcing agents for rubber compositions is clearly shown by the following examples. In carrying out the examples, the rubber compositions are readily prepared by conventional mechanical methods. For example, the rubber and the carbon black reinforcing agent are intimately admixed together on a conventional mixing machine of the type normally used for mixing rubber or plastics such as a Banbury mixer and/or a roll mill in order to insure satisfactory dispersion. The rubber compositions are compounded according to standard industry formulations for both a natural rubber and synthetic rubber-containing formulation. The resulting vulcanizates to be tested are cured at 293°F for 30 minutes when natural rubber is used and for 50 minutes when a synthetic rubber, styrene-butadiene rubber in this instance, is employed. In evaluating the performance of the novel carbon blacks of the present invention, the following formulations are utilized wherein the quantities are specified in parts by weight.

| Ingredient | Natural Rubber Recipe | Synthetic Rubber Recipe No. 1 | Synthetic Rubber Recipe No. 2 |
|---|---|---|---|
| Polymer | 100 (Natural Rubber) | 100 (Styrene-Butadiene) | 89.38 (Styrene-Butadiene) 35 (Cis-4-polybutadiene) |
| Zinc Oxide | 5 | 5 | 3 |
| Sulfur | 2.5 | 2.0 | 1.75 |
| Stearic Acid | 3 | 1.5 | 2 |
| Flexamine | — | — | — |
| Santocure (CBS) | — | — | 1.4 |
| Altax (MBTS) | 0.6 | 2.0 | — |
| Sundex 790 | — | — | 25.6 |
| Wingstay 100 | — | — | 2 |
| Sunproof Improved | — | — | 2.5 |
| Carbon Black | 50 | 50 | 75 |

With regard to the above, Altax (MBTS) is the trade name of R. T. Vanderbilt Company for mercaptobenzothiazyl disulfide accelerator. Flexamine is the trade designation of an antioxidant sold by U.S. Rubber Company. Santocure (CBS) is the trade designation for N-cyclohexyl-2-benzothiazole-sulfenamide, a curing agent for rubber systems. Sundex 790 is the trade name for a plasticizer sold by Sun Oil Company. Sunproof Improved is the trade name for an antiozonant sold by Uniroyal Chemical Company. Wingstay 100 is the trade name for a stabilizer comprising mixed diaryl-p-phenylene diamines sold by Goodyear Tire and Rubber Company.

In the following examples there is demonstrated the advantageous and unexpected results achieved by the use of the carbon black products described hereinabove as additives in rubber formulations. It will, of course, be apparent that the examples, while being illustrative of the present invention, should not be construed as limiting or restrictive in any way.

EXAMPLE 6

On a conventional roll mill there are mixed to a homogeneous blend 100 parts by weight of natural rubber, 5 parts by weight of zinc oxide, 3 parts by weight of stearic acid, 2.5 parts by weight of sulfur, 0.6 parts by weight of mercaptobenzothiazyl disulfide (MBTS) and 50 parts by weight of the carbon black prepared in accordance with Example 2. The resulting compound is subsequently cured at 293°F for a period of 30 minutes. This formulation is referred to as the ASTM natural rubber recipe. A determination of properties of the vulcanizate gives a value of 49.3 for Mooney viscosity ML-4' at 250°F, a tensile strength of 3720 p.s.i., a 300% modulus of 2850 p.s.i., an elongation of 400%, and a Shore hardness of 67.

EXAMPLE 7

Following the procedure of Example 6 and using in lieu of the carbon black employed therein, 50 parts by weight of the carbon black of Example 3, there is obtained a rubber compound having a 300% modulus of 2566 p.s.i., a tensile strength of 4110 p.s.i., an elongation of 463%, a Shore A hardness of 67.3, and a Mooney viscosity ML-4' at 250°F of 41.6.

EXAMPLE 8

Following the procedure of Example 6 and substituting 50 parts by weight of the carbon black of Example 4 for the black used therein, a vulcanizate is prepared. Results on this vulcanizate include a tensile strength of 4102 p.s.i., a 300% modulus of 2500 p.s.i., an elongation of 467%, a Shore A hardness of 66.2, and a Mooney viscosity ML-4' at 250°F of 40.6.

EXAMPLE 9

In accordance with the procedure of Example 6, a vulcanizate is prepared utilizing 50 parts by weight of the carbon black of Example 5. Testing of the vulcanizate reveals a 300% modulus of 2691 p.s.i., a tensile strength of 4379 p.s.i., an elongation of 488%, a Shore A hardness of 67.1, and a Mooney viscosity ML-4' at 250°F of 43.9.

EXAMPLE 10

100 parts by weight of a copolymer of 23.5 parts styrene and 76.5 parts butadiene, 5 parts by weight of zinc oxide, 2 parts by weight of sulfur, 1.5 parts by weight of stearic acid, 2 parts by weight of mercaptobenzothiazyl disulfide, and 50 parts by weight of the carbon black of Example 2 are mixed on a roll mill to a homogeneous blend designated hereinabove as synthetic rubber recipe No. 1. This recipe is also known as the ASTM standard industry synthetic rubber recipe. Following the normal 50 minute curing time, the vulcanizate is tested for various physical properties. The determinations reveal a tensile strength of 4470 p.s.i., a 300% modulus of 3250 p.s.i., an elongation of 410% and a Shore A hardness of 67.

EXAMPLE 11

Following the procedure of Example 10 and using for the carbon black employed therein a carbon black as prepared in Example 3, there is obtained a cured synthetic rubber vulcanizate. The results obtained on this vulcanizate show a 300% modulus of 2730 p.s.i., a tensile strength of 4623 p.s.i., an elongation of 480%, a Mooney viscosity ML-4' at 212°F of 83.9 and a Shore A hardness of 70.

EXAMPLE 12

Following the procedure of Example 10 and using for the carbon black employed therein a carbon black as prepared in Example 4, there is obtained a cured rubber vulcanizate. The results obtained on this vulcanizate show a 300% modulus of 2622 p.s.i., a tensile strength of 4608 p.s.i., an elongation of 480%, a Mooney viscosity ML-4' at 212°F of 81.7 and a Shore A hardness of 69.2.

EXAMPLE 13

A cured rubber vulcanizate is produced according to Example 10 with the exception that, for the carbon black utilized therein, 50 parts by weight of carbon black manufactured as described in Example 5 is employed herein. Measurements on this vulcanizate reveal a Mooney viscosity ML-4' of 86.9 at 212°F, a tensile strength of 4530 p.s.i., a 300% modulus of 2901 p.s.i., and an elongation of 456%.

EXAMPLE 14

In this example there is utilized for rubber evaluation purposes the formulation designated hereinbefore as synthetic rubber recipe No. 2. In particular, there are mixed on a Banbury mixer at 150 rpm to a homogeneous blend 89.38 parts by weight of a copolymer of 23.5 parts styrene and 76.5 parts butadiene, 35 parts by weight of cis-4-poly-butadiene rubber, 25.6 parts by weight of Sundex 790 which is the trade name for a plasticizer sold by Sun Oil Company, 3 parts by weight of zinc oxide, 2.5 parts by weight of Sunproof Improved which is the trade name for an antiozonant sold by Uniroyal Chemical Company, 2 parts by weight of Wingstay 100 which is the trade name for a stabilizer comprising mixed diaryl-p-phenylene diamines sold by Goodyear Tire and Rubber Company, 2 parts by weight of stearic acid, 1.75 parts by weight of sulfur, 1.4 parts by weight of Santocure (CBS) and 75 parts by weight of the carbon black prepared as shown in Example 1. The results obtained on this vulcanizate cured for 60 minutes give a value for Mooney viscosity ML-4' at 212°F of 50, a Mooney Scorch T5/T10 of 18/19, an extrusion shrinkage of 37.9%, a tensile strength of 2700 p.s.i., a 300% modulus of 1300 p.s.i., an elongation of 460% and a Shore hardness of 60.

EXAMPLE 15

For purposes of determining roadwear ratings, rubber vulcanizates of the formulation described fully hereinbefore are prepared utilizing each of the blacks prepared in Examples 1 through 5. Moreover, as mentioned in the test procedures for determining roadwear ratings, the results are reported in the following TABLE I relative to Cabot's standard ISAF type black which is arbitrarily assigned a roadwear rating of 100 percent. Also included in TABLE I for purposes of comparison are roadwear ratings for a comprehensive group of rubber grade carbon blacks made and sold by Cabot Corporation under the trade name Vulcan.

TABLE I (* Carbon Blacks made and sold by Cabot Corporation)

| Carbon Black Sample | Representative Type of Carbon Black | Iodine Surface Area, m²/g | Roadwear Rating Relative to Cabot's Standard ISAF Black, % |
|---|---|---|---|
| Example 1 | | 129 | 105 |
| Example 2 | | 103 | 108 |
| Example 3 | | 74.6 | 100 |
| Example 4 | | 69.5 | 100 |
| Example 5 | | 78.6 | 102 |
| Vulcan 3* | HAF | 65 | 86 |
| Vulcan 3H* | HAF-HS | 70 | 93 |
| Vulcan 5H* | | 80 | 98 |
| Vulcan 6* | ISAF | 98 | 100 |
| Vulcan 6H* | ISAF-HS | 104 | 102 |
| Vulcan 9* | SAF | 114 | 102 |
| Vulcan 9H* | SAF-HS | 118 | 103 |

It will be seen from the data presented in the above TABLE I that carbon blacks conventionally made and sold by Cabot Corporation for use in rubber as reinforcements, bearing the trade name designations of Vulcan 3 through Vulcan 9H carbon blacks, cover the range of HAF type blacks through high structure SAF type blacks. As shown in the table, the roadwear ratings for these conventionally available rubber-reinforcing blacks ranges from a low of 86% to a high of 103 percent. It has now been shown herein that the novel blacks of the present invention consistently demonstrate superior roadwear ratings when compared to the closest available carbon black. The comparison is most suitably accomplished by comparing the roadwear ratings for a black of the present invention with a conventional black having a similar iodine surface area.

In order to present a more convenient comparison of the use of the blacks of this invention as rubber blacks with the conventional rubber grade carbon blacks produced and sold by Cabot Corporation, there are presented the following two tables. In TABLE II there is shown for each of the blacks therein a summary of analytical properties. The data on the more important physical properties attributable to the use of each of the blacks in both natural rubber and industry synthetic rubber formulations are presented in TABLE III hereinbelow. The data concerning the conventional rubber grade carbon blacks is published and distributed widely by Cabot Corporation and particular emphasis has been placed herein on Technical Report RG-130 entitled "Cabot Carbon Blacks in a Variety of Elastomers," published by Cabot Corporation in January 1970. In this technical report, on pages 4 and 6, there is disclosed values for the physical properties of natural and synthetic rubber (SBR) formulations containing all the conventionally available rubber blacks. It is this data which is reproduced in TABLE III for each of the conventional blacks regarded herein as control blacks. In addition, there is included in TABLES II and III data on Industry Reference Black No. 3 (hereinafter referred to as IRB No. 3) inasmuch as this black has been the accepted reference black since June 1970. The data on IRB No. 3 reproduced hereinbelow is found in Technical Service Report TG-70-1 entitled "Industry Reference Black No. 3", written by Messrs. Juengel and O'-Brien and published by Cabot Corporation on April 1, 1970. Finally, it will be noted that the analytical and physical properties of the blacks of the present invention as described in the following tables have been disclosed in the examples of this application.

sible in all respects. In selecting the control blacks, accordingly, there has been provided a representative group of available blacks made and sold by Cabot Corporation under the trade name, Vulcan, which are similar in respect to iodine surface areas. This listing of blacks is sufficiently representative to permit an effective evaluation thereof in the reinforcement of natural and synthetic rubber formulations as demonstrated in TABLE III.

TABLE III

| Carbon Black Sample | Ex. 1 | Ex. 2 | Ex. 3 | Ex. 4 | Ex. 5 | Vulcan 3* | Vulcan 3H* | Vulcan 5H* | Vulcan 6* | Vulcan 6H* | Vulcan 9* | Vulcan 9H* | IRB No. 3 |
|---|---|---|---|---|---|---|---|---|---|---|---|---|---|
| NATURAL RUBBER RECIPE | | | | | | | | | | | | | |
| Tensile, p.s.i. | | 3720 | 4110 | 4102 | 4379 | 4000 | 3850 | 3850 | 4075 | 4100 | 4400 | 4150 | 4137 |
| 300% Modulus, p.s.i. | | 2850 | 2566 | 2500 | 2691 | 2400 | 2600 | 2550 | 2300 | 2500 | 2250 | 2550 | 2300 |
| Elongation, % | | 400 | 463 | 467 | 488 | 470 | 460 | 480 | 530 | 490 | 530 | 510 | 495 |
| Shore Hardness | | 67 | 67 | 66 | 67 | 65 | 67 | 67 | 66 | 67 | 66 | 68 | 67 |
| SYNTHETIC RUBBER RECIPE NO. 1 | | | | | | | | | | | | | |
| Tensile, p.s.i. | | 4470 | 4623 | 4608 | 4530 | 4050 | 3950 | 4050 | 4250 | 4150 | 4700 | 4500 | 4251 |
| 300% Modulus, p.s.i. | | 3250 | 2730 | 2622 | 2901 | 2450 | 2800 | 2750 | 2550 | 2750 | 2600 | 2800 | 2456 |
| Elongation, % | | 410 | 480 | 480 | 456 | 500 | 470 | 470 | 520 | 490 | 510 | 490 | 483 |
| Shore Hardness | | 67 | 70 | 69 | — | 67 | 69 | 69 | 68 | 69 | 69 | 71 | 70 |
| SYNTHETIC RUBBER RECIPE NO. 2 | | | | | | | | | | | | | |
| Tensile, p.s.i. | 2700 | — | — | — | — | 2650 | 2610 | 2670 | 2780 | 2750 | 2910 | — | — |
| 300% Modulus, p.s.i. | 1300 | — | — | — | — | 850 | 1070 | 1100 | 1030 | 1160 | 820 | — | — |
| Elongation, % | 460 | — | — | — | — | 650 | 600 | 580 | 590 | 570 | 630 | — | — |
| Shore Hardness | 60 | — | — | — | — | 51 | 53 | 53 | 55 | 57 | 56 | — | — |
| Roadwear, % ISAF | 105 | 108 | 100 | 100 | 102 | 86 | 93 | 98 | 100 | 102 | 102 | 103 | — |

* Carbon Blacks made and sold by Cabot Corporation

A study of the data presented above reveals that the novel blacks of the present invention are generally at least as effective as the conventional rubber grade blacks in reinforcing natural rubber vulcanizates and synthetic rubber vulcanizates. Moreover, while the important physical properties of tensile strength, modulus and elongation are maintained at levels equivalent to that obtained with the conventional rubber grade blacks, it is also noted that other desirable performance characteristics of the rubber compositions of the present invention are achieved by the incorporation of the carbon blacks of the present invention. In a specific instance herein, a close comparison of the black of Example 5 with a conventional Vulcan 5H reveals that the

TABLE II

| Carbon Black Sample | Analytical Properties of Carbon Blacks | | | | | |
|---|---|---|---|---|---|---|
| | Iodine Surface Area, m²/g | BET Surface Area, m²/g | DBP Absorption cc/100 g | Tinting Strength, % SRF | Tint Factor | Tint Contribution, % |
| Example 1 | 129 | 146 | 155 | 257 | 313.3 | 82 |
| Example 2 | 103 | 118 | 164 | 242 | 316 | 77 |
| Example 3 | 74.6 | 92 | 112 | 239 | 314 | 76 |
| Example 4 | 69.5 | 90 | 108 | 237 | 316 | 75 |
| Example 5 | 78.6 | 102 | 121 | 240 | 316 | 76 |
| Vulcan 3* | 65 | 82 | 102 | 203 | 284 | 71 |
| Vulcan 3H* | 70 | 90 | 122 | 205 | 291 | 70 |
| Vulcan 5H* | 80 | 101 | 130 | 225 | 304 | 74 |
| Vulcan 6* | 98 | 118 | 115 | 232 | 291 | 80 |
| Vulcan 6H* | 104 | 116 | 126 | 243 | 302 | 80 |
| Vulcan 9* | 114 | 142 | 114 | 250 | 300 | 83 |
| Vulcan 9H* | 118 | 124 | 135 | 231 | 286 | 81 |
| IRB No. 3 | 67 | 82 | 100 | 208 | 285 | 73 |

* Carbon Blacks made and sold by Cabot Corporation.

In regard to the above TABLE II, it is to be noted that an attempt has been made to compare the novel rubber reinforcing blacks of the present invention with conventionally available blacks which are as similar as possible tensile strength and modulus of rubber compositions containing the blacks of this invention are indeed highly superior to the use of conventional rubber blacks. Most importantly, however, it is clearly evidenced by the data in TABLES I and III that a marked improvement in roadwear ratings of treadstocks is achieved by utilizing as reinforcements the blacks of the present invention rather than the conventional rubber grade blacks.

Numerous chemical curing systems have been found useful in promoting the interaction of the carbon black reinforcement and the natural or synthetic rubber in practicing the present invention. Exemplary of the chemical curing agents are mercaptobenzothiazyl disulfide (MBTS), N-cyclohexyl-2-benzothiazole-sulfenamide and tetramethylthiuramdisulfide (TMTD). Furthermore, for many purposes, it may be desirable to compound the rubber compositions of the present invention with other conventional rubber additives. Illustrative of such additives are other materials such as titanium dioxide, silicon dioxide, zinc oxide, calcium carbonate, clays, calcium silicate, zinc sulfide, hydrous alumina and calcined magnesia; thermoplastic resins such as polyvinyl chloride and epoxy resins as compounding substances; vulcanizing agents, vulcanization accelerators; accelerator activators, sulfur curatives; antioxidants; decelerators; heat stabilizers; plasticizers, softeners or extender oils such as mineral oil, resins, fats, waxes, petroleum distillates, vegetable oils, e.g., linseed oil and soybean oil, di-n-hexyl adipate, trioctyl phosphate, chlorinated hydrocarbons, ether, ketones, terpenes, gum turpentine, rosin, pine tar, coal tar products including alkyl naphthalenes and polynuclear aromatics and liquid polymers of conjugated dienes; and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a rubber selected from the group consisting of natural and synthetic rubbers and a carbon black product selected from the group consisting of furnacetype carbon black products characterized by having a value for the tint factor relationship of $[\text{tint} + 0.6 (D_a)]$, wherein $D_a$ is apparent diameter, of at least 311 to 316, a value for the tint contribution ratio of tint to tint factor of at least 0.75 to 0.82, a pH value of at least 4, an iodine surface area of at least 67 to about 145 m$^2$/g and a value for the BET total surface area of less than 160 m$^2$/g, wherein the carbon black product is present in amounts of from about 10 to about 250 parts by weight per 100 parts by weight of rubber.

2. A composition as defined in claim 1 wherein the rubber is natural rubber.

3. A composition as defined in claim 1 wherein the rubber is synthetic rubber.

4. A composition as defined in claim 1 wherein the carbon black product is present in amounts of from about 20 to about 100 parts by weight per 100 parts by weight of rubber.

5. A composition as defined in claim 1 wherein the carbon black product is present in amounts of from about 40 to about 80 parts by weight per 100 parts by weight of rubber.

6. A composition as defined in claim 1 wherein the carbon black product has a tint contribution ranging from 0.75 to 0.80.

7. A composition as defined in claim 1 wherein the carbon black product has an iodine surface area ranging from 69 to about 145 m$^2$/g.

8. A composition as defined in claim 1 wherein the carbon black product has an iodine surface area ranging from about 75 to about 135 m$^2$/g.

9. A composition as defined in claim 1 wherein the carbon black product has a pH value ranging from about 6 to about 9.

10. A composition as defined in claim 1 wherein the rubber is a copolymer of styrene and butadiene.

* * * * *